US012299214B2

United States Patent
Rivolta et al.

(10) Patent No.: US 12,299,214 B2
(45) Date of Patent: May 13, 2025

(54) LOW POWER LIFT-UP GESTURE DETECTION WITH SHAKE REJECTION

(71) Applicant: STMicroelectronics International N.V., Geneva (CH)

(72) Inventors: Stefano Paolo Rivolta, Desio (IT); Federico Rizzardini, Settimo Milanese (IT); Lorenzo Bracco, Chivasso (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/447,147

(22) Filed: Aug. 9, 2023

(65) Prior Publication Data

US 2025/0053246 A1 Feb. 13, 2025

(51) Int. Cl.
*G06F 3/01* (2006.01)
*G06F 3/0346* (2013.01)

(52) U.S. Cl.
CPC ............ *G06F 3/0346* (2013.01); *G06F 3/017* (2013.01)

(58) Field of Classification Search
CPC ................ G06F 3/0346; G06F 3/017
See application file for complete search history.

(56) References Cited

U.S. PATENT DOCUMENTS

| | | | |
|---|---|---|---|
| 8,723,986 B1* | 5/2014 | Merrill, Jr. | ........ H04M 1/72403 348/207.99 |
| 9,354,709 B1 | 5/2016 | Heller et al. | |
| 10,303,239 B2 | 5/2019 | Tu et al. | |
| 11,360,585 B2 | 6/2022 | Rizzardini et al. | |
| 2011/0054831 A1* | 3/2011 | Fujiwara | ............... G06F 3/0346 702/141 |
| 2012/0116710 A1* | 5/2012 | Fujiwara | ............... G06F 3/0346 702/141 |
| 2013/0147704 A1 | 6/2013 | Kuo et al. | |
| 2013/0282325 A1* | 10/2013 | Takahashi | ............. G06F 3/0346 702/141 |
| 2015/0276792 A1* | 10/2015 | Sato | ........................ G06F 3/038 73/510 |
| 2015/0286285 A1* | 10/2015 | Pantelopoulos | ........ G06F 3/048 345/156 |
| 2016/0018872 A1 | 1/2016 | Tu et al. | |

(Continued)

FOREIGN PATENT DOCUMENTS

| | | | |
|---|---|---|---|
| CN | 105072264 A | 11/2015 | |
| CN | 105892301 A | 8/2016 | |

(Continued)

OTHER PUBLICATIONS

Alexander Vakrilov, Detecting shakes in NativeScript, Dec. 3, 2019, https://blog.nativescript.org/detecting-shakes-in-nativescript/ (Year: 2019).*

*Primary Examiner* — Christopher E Leiby
(74) *Attorney, Agent, or Firm* — Seed IP Law Group LLP

(57) ABSTRACT

The present disclosure is directed to lift-up gesture detection for electronic devices. An initial lift-up gesture is detected in response to an orientation change and a lift-up motion of the device being detected. The initial lift-up gesture is validated as a true lift-up gesture in a case where a shaking motion of the device is not being detected when the initial lift-up gesture is detected. If a shaking motion of the device is detected when the initial lift-up gesture is detected, the initial lift-up gesture is rejected.

12 Claims, 2 Drawing Sheets

(56) References Cited

U.S. PATENT DOCUMENTS

| | | | |
|---|---|---|---|
| 2017/0048382 A1 | 2/2017 | Watanabe et al. | |
| 2017/0364156 A1* | 12/2017 | Kim | G06F 1/163 |
| 2018/0136742 A1 | 5/2018 | Kashiwagi et al. | |
| 2020/0379573 A1* | 12/2020 | Takahashi | G06F 3/017 |
| 2021/0232225 A1* | 7/2021 | Cipoletta | G06F 3/015 |
| 2022/0155856 A1 | 5/2022 | Agrawal et al. | |
| 2024/0021300 A1* | 1/2024 | Wang | G06F 3/02 |

FOREIGN PATENT DOCUMENTS

| | | | |
|---|---|---|---|
| CN | 108108015 A | 6/2018 | |
| CN | 111580664 A | 8/2020 | |

\* cited by examiner

LOW POWER LIFT-UP GESTURE DETECTION WITH SHAKE REJECTION

BACKGROUND

Technical Field

The present disclosure is directed to devices and methods for detecting whether an electronic device is being picked or lifted up by a user.

Description of the Related Art

Many electronic devices support a comprehensive and system-wide set of power management features to improve user experience, extend battery duration, save energy, and reduce heat and noise of the device. Power management features are particularly important for portable devices, such as tablets, and mobile devices, due to their limited power supply.

Power management features typically include options to transition the device between several different power states. For example, many devices support intermediate power states that are between an off state (e.g., the device is completely shut down and consumes no power) and an on state (e.g., the device is powered on and ready to be used by a user). Intermediate power states may include a sleep state in which the device is in a reduced power, idle state; and a hibernate state that is similar to the off state with the capability of restoring the system context when the device is turned on again. Intermediate power states allow a device to quickly return to an on state when the device is ready to be used by a user.

Many devices utilize device context recognition to customize transitions between power states. Portable devices, in particular, are capable of detecting whether the device is being picked or lifted up by a user to view, and then transitioning between power states. For example, the device may switch from a hibernate or sleep state to an on state in response to detecting that the device is lifted up to be used by the user. Lift-up gesture detection is useful for improving user experience, as the device may be set to an on state without user action, such as pushing a button or tapping a touchscreen.

BRIEF SUMMARY

The present disclosure is directed to lift-up gesture detection for electronic devices, such as tablets, smart watches, and mobile devices. The lift-up gesture detection provides a low power and low latency solution, and includes shake rejection in order to minimize false lift-up gesture detections caused by shaking of the device.

An initial lift-up gesture is detected in response to an orientation change and a lift-up motion of the device being detected. An orientation change is detected based on acceleration measurements of the device filtered with a band pass filter. A lift-up motion is detected based on acceleration measurements of the device filtered with a low pass filter.

The initial lift-up gesture is validated as a true lift-up gesture in a case where a shaking motion of the device is not being detected when the initial lift-up gesture is detected. If a shaking motion of the device is detected when the initial lift-up gesture is detected, the initial lift-up gesture is rejected. A shaking motion is detected based on acceleration measurements of the device.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, many portable devices detect whether the device is being picked or lifted up by a user, and then transitioning between power states. Other actions may also be performed, such as showing a notification on a lock screen or starting a face unlock feature.

It is important for lift-up gesture detection to have low power consumption as portable devices have limited power supply and lift-up gesture detection is typically an always-on feature performed during hibernate or sleep state of the device. Further, false lift-up detections caused by shaking should be minimized, as portable devices are susceptible to shaking due to its size and use case. In addition, it is desirable to have lift-up gesture detection with minimal response time for improved user experience.

The present disclosure is directed to low power lift-up gesture detection for electronic devices, such as tablets, smart watches, and mobile devices. The lift-up gesture detection has low power consumption and processing time. Further, the lift-up gesture detection includes shake rejection in order to avoid false lift-up gesture detections caused by shaking of the device.

Figure 1:
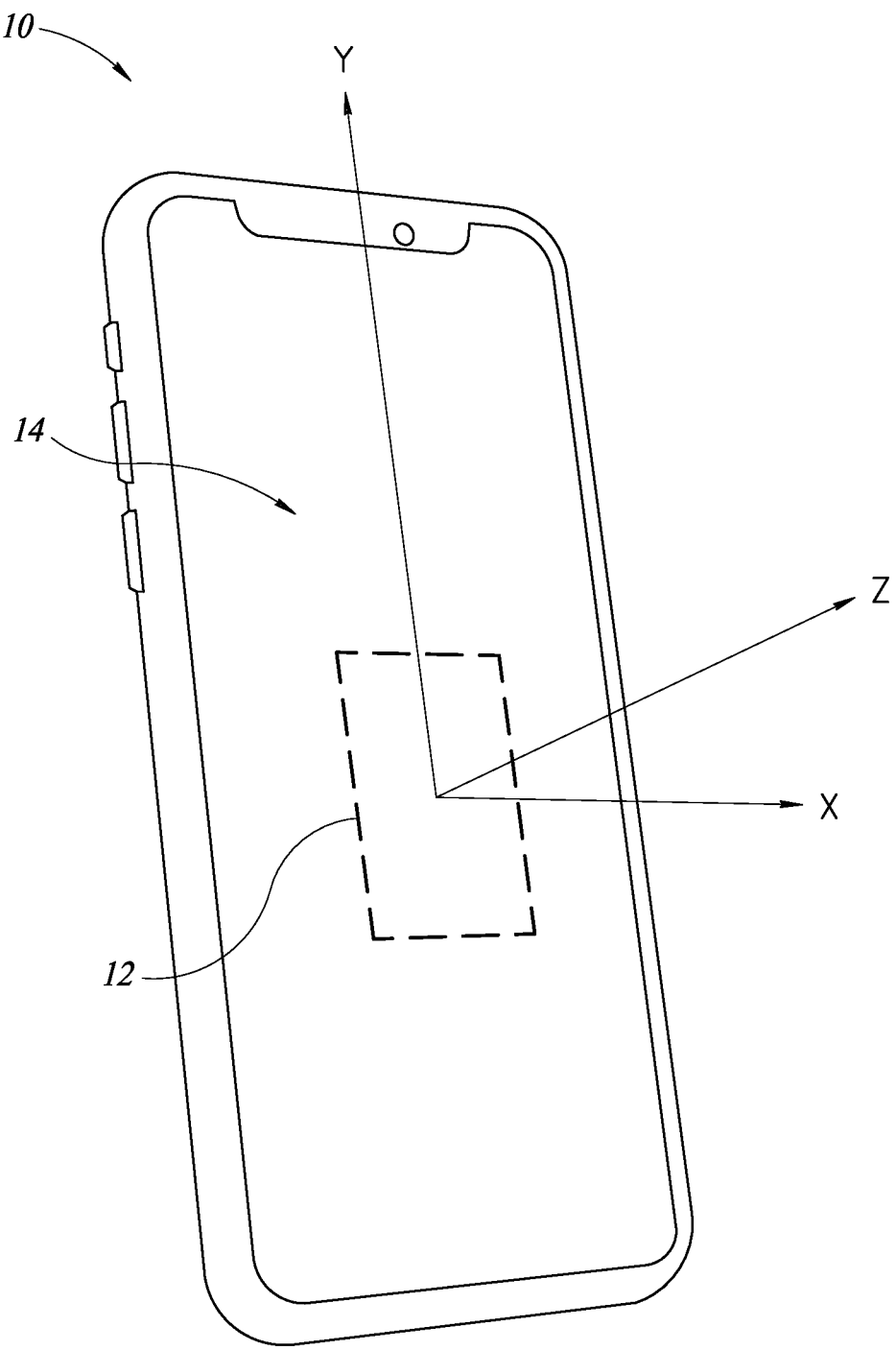
FIG. 1 is a device according to an embodiment disclosed herein.

FIG. 1 is a device 10 according to an embodiment disclosed herein.

The device 10 is an electronic device that is configured to detect whether the device 10 is being picked or lifted up by a user. In this embodiment, the device 10 is a mobile device. However, the device 10 may be another type of device, such as a tablet, and a smart watch.

The device 10 includes an accelerometer 12 to measure acceleration of the device 10. The accelerometer 12 is a 3-axis accelerometer that measures acceleration along the x-axis, y-axis, and the z-axis shown in FIG. 1. The x-axis extends in a horizontal direction and in the same plane as a plane including a front surface 14 of the device 10. The y-axis is transverse to the x-axis, and extends in a vertical direction and in the same plane including the front surface 14 of the device 10. The z-axis is transverse to the x-axis and the y-axis, and extends in a horizontal direction and in a plane transverse to the plane including the front surface 14 of the device 10. In one embodiment, as shown in FIG. 1, the front surface 14 includes a screen of the device 10.

The various embodiments described will be discussed with respect to the axes shown in FIG. 1. However, other orientations of the axes are also possible.

In one embodiment, the accelerometer 12 is included in a multi-sensor device that includes one or more types of sensors including, but not limited to, the accelerometer 12 and a gyroscope. The multi-sensor device also includes its own onboard memory, and processor or processing circuitry coupled to the onboard memory. The processor is configured to receive and process data generated by the sensors; and execute simple programs, such as finite state machines and decision tree logic, stored in the onboard memory. The processor discussed herein may include one or more processors.

In contrast to a general-purpose processor of the device 10, the multi-sensor device is a power-efficient, low-powered device that consumes between, for example, 5 and 20 microamps during processing. As such, the multi-sensor device, including the accelerometer 12, is able to remain on after the device 10 enters a sleep state. In the sleep state, the general-purpose processor and other electronic components (e.g., speakers, sensors, processors) of the device 10 are set to a low-powered or off state. The device 10 enters the sleep state, for example, in response to a determined amount of time of inactivity elapsing.

The device 10 is configured to detect a lift-up state of the device 10. In the lift-up state, the device 10 is being picked or lifted up by a user from, for example, a table or the user's pocket. The device 10 detects the lift-up state using acceleration measurements by the accelerometer 12.

Figure 2:
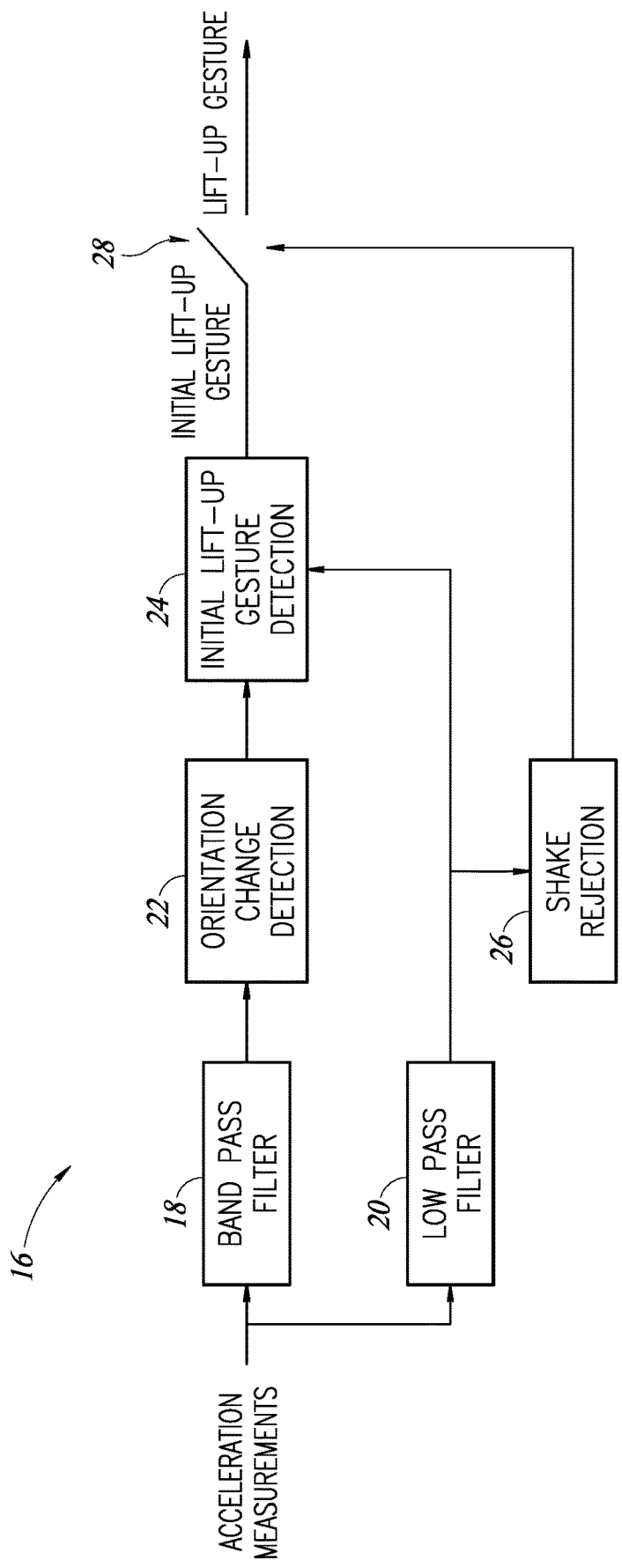
FIG. 2 is a block diagram for lift-up gesture detection according to an embodiment disclosed herein.

FIG. 2 is a block diagram for lift-up gesture detection 16 according to an embodiment disclosed herein.

The method for lift-up gesture detection 16 is executed by the device 10. In a case where the accelerometer 12 is included in a multi-sensor device as discussed above, lift-up gesture detection 16 is implemented as a program or a set of instructions stored in the onboard memory of the multi-sensor device, and is executed by the processor included in the multi-sensor device. It is also possible for the program for lift-up gesture detection to be stored in memory of the device 10, and executed by a general-purpose processor of the device 10.

In block 18, acceleration measurements by the accelerometer 12 are filtered with a band pass filter in order to remove direct current (DC) components from the accelerations signals. In one embodiment, the band pass filter is an infinite impulse response (IIR) with cutoff frequencies of 0.3 hertz and 1.5 hertz.

In block 20, acceleration measurements by the accelerometer 12 are filtered with a low pass filter in order to select gravity and reduce potential linear acceleration (e.g., acceleration due to movement along the x-axis, y-axis, or z-axis in FIG. 1) applied to the accelerometer 12 while the device 10 is being lifted up. In one embodiment, the low pass filter is an IIR with cutoff frequency of 1 hertz.

Blocks 18 and 20 may also be removed from the lift-up gesture detection 16. In this case, blocks 22, 24, and 26 utilize acceleration measurements directly from the accelerometer 12.

In block 22, orientation change detection is performed. The orientation change indicates the device 10 has changed in position, and is used as trigger for detecting an initial lift-up gesture.

The orientation change of the device 10 is detected based on current filtered acceleration measurements by the band pass filter in block 18. More specifically, the orientation change is detected in a case where the band pass filtered acceleration along the y-axis $XL_{BPY}$ is greater than an orientation change threshold value $TH_{OC}$ for an orientation change threshold amount of time (or a number of acceleration measurement samples) $T_{OC}$. Stated differently, the device 10 undergoes an orientation change in response to the following condition (1) being satisfied:

$$XL_{BPY} > TH_{OC} \qquad (1)$$

$$\text{for } T_{OC}$$

In one embodiment, $TH_{OC}$ is between 0.05 and 0.5 g. In one embodiment, TOC is between 150 and 500 milliseconds.

The device 10 continues to monitor for an orientation change of the device 10 in case an orientation change of the device 10 is not detected.

The lift-up gesture detection 16 moves to block 24 in case an orientation change of the device 10 is detected.

In block 24, an initial lift-up gesture detection is performed. The initial lift-up gesture detection determines whether the new device orientation after the orientation change, which is detected in block 22, is compatible or consistent with a lift-up gesture orientation.

The initial lift-up gesture is detected based on current filtered acceleration measurements by the low pass filter in block 20. More specifically, the initial lift-up gesture is detected in a case where the low pass filtered acceleration along the y-axis $XL_{LPY}$ is greater than a y-axis lift-up gesture threshold value $TH_{LUY}$, an absolute value of the low pass filtered acceleration along the x-axis $XL_{LPX}$ is less than or equal to a x-axis lift-up gesture threshold value $TH_{LUX}$, and the low pass filtered acceleration along the z-axis $XL_{LPZ}$ is greater than a z-axis lift-up gesture threshold value $TH_{LUZ}$ for a lift-up gesture threshold amount of time (or a number of acceleration measurement samples) $T_{LU}$. Stated differently, the device 10 undergoes an initial lift-up gesture in response to the following condition (2) being satisfied:

$$XL_{LPY} > TH_{LUY} \qquad (2)$$

$$\text{AND}$$

$$\text{abs}(XL_{LPX}) \leq TH_{LUX}$$

$$\text{AND}$$

$$XL_{LPZ} > TH_{LUZ} \text{ for } T_{LU}$$

In one embodiment. $TH_{LUY}$ is between 0.09 and 0.71 g. $TH_{LUX}$ is between 0.17 and 0.71 g, and $TH_{LUZ}$ is between 0 and 0.71 g. This set of threshold values correspond to a lift-up angle between 5 and 135 degrees relative to the y-axis. Other sets of threshold values may also be used for different lift-up angle ranges. In one embodiment, $T_{LU}$ is between 75 and 300 milliseconds.

The initial lift-up gesture detection outputs or sets an initial lift-up gesture flag or state to indicate that an initial lift-up gesture has not been detected in case condition (2) is not satisfied. The lift-up gesture detection 16 then returns to block 22 in order to continue to monitor for another orientation change of the device 10.

The initial lift-up gesture detection outputs or sets an initial lift-up gesture flag or state to indicate that an initial lift-up gesture has been detected in case condition (2) is satisfied. The lift-up gesture detection 16 then returns to block 22 in order to continue to monitor for another orientation change of the device 10.

In block 26, shake rejection is performed. Block 26 is performed concurrently with blocks 22 and 24. As discussed above, false lift-up detections might occur due to shaking of the device. For example, lift-up gestures may be incorrectly detected during transport of the device in a user's pocket or bag. Portable devices are particularly susceptible to false lift-up detections due to its size and use case. The shake rejection in block 26 validates whether the initial lift-up gesture detected in block 24 is a true lift-up gesture.

The shake rejection utilizes current filtered acceleration measurements by the low pass filter in block 20. During normal conditions, a norm $XL_{LPN}$ of the low pass filtered accelerations is about 1 g. When the device is shaken, the norm $XL_{LPN}$ increases. More specifically, the shake rejection determines whether the norm $XL_{LPN}$ of the low pass filtered accelerations is greater than a shake threshold value $TH_N$. Stated differently, the shake rejection determines whether the following condition (3) is satisfied:

$$XL_{LPN} > TH_N \quad (3)$$

In one embodiment, the shake threshold value $TH_N$ is between 1.1 and 1.5 g, which is consistent with the device 10 being shaken.

The norm $XL_{LPN}$ is calculated using the following equation (4):

$$XL_{LPN} = \sqrt{XL_{LPX}^2 + XL_{LPY}^2 + XL_{LPZ}^2} \quad (4)$$

In a case where the norm $XL_{LPN}$ is greater than the shake threshold value $TH_N$, a value of a shake count $shake_{CNT}$ is set to a shake time out value $shake_{TIME}$. Namely, the shake count $shake_{CNT}$ is set to the following equation (5):

$$shake_{CNT} = shake_{TIME} \quad (5)$$

As discussed in further detail below, the shake count $shake_{CNT}$ is a counter used to validate the initial lift-up gesture detected in block 24 as a true lift-up gesture (i.e., the device 10 has been picked up), or invalidate the initial lift-up gesture detected in block 24 as a false lift-up gesture caused by shaking of the device 10 (i.e., the device 10 has not been picked up but shaken instead).

The shake time out value $shake_{TIME}$ is a time out value for the shake rejection. Stated differently, the shake time out value $shake_{TIME}$ is a length of time in which the shake rejection block 26 inhibits the initial lift-up gesture. In one embodiment, the shake time out value $shake_{TIME}$ is greater than a sum of the orientation change threshold amount of time $T_{OC}$ and the lift-up gesture threshold amount of time $T_{LU}$, in order to avoid interference from a previous shaking of the device 10. In one embodiment, the accelerometer 12 obtains acceleration measurement samples at 26 hertz, and the shake time out value $shake_{TIME}$ is between 6 and 26 samples. In this embodiment, the shake rejection is enabled between approximately 230 milliseconds and 1000 milliseconds.

In a case where the norm $XL_{LPN}$ is not greater than (i.e., equal to or less than) the shake threshold value $TH_N$, the shake count $shake_{CNT}$ is decremented by one at a set interval. Namely, the shake count $shake_{CNT}$ is set to the following equation (6) at a set interval:

$$shake_{CNT} = shake_{CNT} - 1 \quad (6)$$

In one embodiment, the shake count $shake_{CNT}$ is decremented by one at every acceleration measurement sample generated by the accelerometer 12. The smallest or lowest value the shake count $shake_{CNT}$ may have is zero.

In response to the shake count $shake_{CNT}$ being equal to zero (indicating the device 10 is in a non-shaking state in which the device 10 is not shaken), a switch 28 is closed. In this case, an initial lift-up gesture detected in block 24 is validated as a true lift-up gesture (e.g., the device 10 has been picked up for viewing), and output from the lift-up gesture detection 16 as a lift-up gesture.

In response to the shake count $shake_{CNT}$ being not equal to (i.e., greater than) zero (indicating the device 10 is in a shaking state in which the device 10 is currently shaken), the switch 28 is opened. In this case, an initial lift-up gesture detected in block 24 is rejected as a false lift-up gesture caused by shaking of the device 10 (e.g., the device 10 has not been picked up but shaken instead), and is not output from the lift-up gesture detection 16 as a lift-up gesture.

The lift-up gesture detection 16 outputs or sets a lift-up gesture flag or state to indicate that a lift-up gesture is detected in a case where (1) the switch 28 is closed (i.e., the shake count $shake_{CNT}$ is equal to zero) and (2) an initial lift-up gesture is detected in block 24. Conversely, the lift-up gesture detection 16 outputs or sets the lift-up gesture flag to indicate that a lift-up gesture is not detected in a case where (1) the switch 28 is opened (i.e., the shake count $shake_{CNT}$ is not equal to zero) or (2) an initial lift-up gesture is not detected in block 24.

It is noted that an initial lift-up gesture detected in block 24 is not held until the switch 28 is closed. Rather, an initial lift-up gesture detected in block 24 is discarded in the event the switch 28 is opened upon detection. As such, the lift-up gesture detection 16 outputs or sets a lift-up gesture flag to indicate that a lift-up gesture is detected when an initial lift-up gesture is detected in block 24 after the switch 28 is closed.

In response to detecting the lift-up gesture, a function, such as a power state, of the device 10 is controlled based on the lift-up gesture. For example, the device 10 is in one of a sleep state or a hibernate state before detecting the lift-up gesture, and is switched to an on state in response to detecting the lift-up gesture. Other actions may also be performed, such as showing a notification on a lock screen or starting a face unlock feature.

The various embodiments disclosed herein provide devices and methods for lift-up gesture detection for electronic devices, such as tablets, smart watches, and mobile devices. The lift-up gesture detection provides low power and low latency detection, along with shake rejection to minimize false lift-up gesture detections caused by the shaking of the device.

A device may be summarized as including: an accelerometer, which, in operation, generates a first acceleration measurement along a first axis, a second acceleration measurement along a second axis transverse to the first axis, and a third acceleration measurement along a third axis transverse to the first axis and the second axis; processing circuitry, which, in operation, receives the first, second, and third acceleration measurements; and memory coupled to the processing circuitry, wherein, using the memory, the processing circuitry, in operation: detects an orientation change of the device based on the second acceleration measurement; detects an initial lift-up gesture of the device based on the first, second, and third acceleration measurements; detects a non-shaking state of the device based on the first, second, and third acceleration measurements; and outputs a lift-up gesture state in response to the orientation change, the initial lift-up gesture, and the non-shaking state being detected.

The first and second axes may be in a plane including a surface of the device.

The processing circuitry, in operation, may filter the second acceleration measurement with a band pass filter; and may detect the orientation change in a case where the filtered second acceleration measurement is greater than a threshold value for a threshold amount of time.

The first and second axes may be horizontal and vertical axes, respectively, in a plane including a surface of the device.

The threshold value may be between 0.05 and 0.5 g, and the threshold amount of time may be between 150 and 500 milliseconds.

The processing circuitry, in operation, may filter the first, second, and third acceleration measurements with a low pass filter; and detect the initial lift-up gesture in a case where an absolute value of the filtered first acceleration measurement is less than or equal to a first threshold value, the filtered second acceleration measurement is greater than a second threshold value, and the filtered third acceleration measurement is greater than a third threshold value for a threshold amount of time.

The first threshold value may be between 0.17 and 0.71 g, the second threshold value is between 0.09 and 0.71 g, and the third threshold value is between 0 and 0.71 g, and the threshold amount of time is between 75 and 300 milliseconds.

The processing circuitry, in operation, may filter the first, second, and third acceleration measurements with a low pass filter; set a counter to a time out value in a case where a norm of the filtered first, second, and third acceleration measurements is greater than a threshold value; decrement the counter by one at a determined interval in a case where the norm of the filtered first, second, and third acceleration measurements is not greater than the threshold value; and detect the non-shaking state in a case where the counter is equal to zero.

The threshold value may be between 1.1 and 1.5 g.

The processing circuitry, in operation, may output the lift-up gesture state in a case where the initial lift-up gesture is detected after the non-shaking state is detected.

The processing circuitry, in operation, may filter the second acceleration measurement with a band pass filter; detect the orientation change in a case where the filtered second acceleration measurement is greater than a first threshold value for a first threshold amount of time; filter the first, second, and third acceleration measurements with a low pass filter; detect the initial lift-up gesture in a case where an absolute value of the filtered first acceleration measurement is less than or equal to a second threshold value, the filtered second acceleration measurement is greater than a third threshold value, and the filtered third acceleration measurement is greater than a fourth threshold value for a second threshold amount of time; set a counter to a time out value in a case where a norm of the filtered first, second, and third acceleration measurements is greater than a fifth threshold value; decrement the counter by one at a determined interval in a case where the norm of the filtered first, second, and third acceleration measurements is not greater than the fifth threshold value; and detect the non-shaking state in a case where the counter is equal to zero.

The time out value may be greater than a sum of the first threshold amount of time and the second threshold amount of time.

A method may be summarized as including: receiving a first acceleration measurement of a device along a first axis, a second acceleration measurement of the device along a second axis transverse to the first axis, and a third acceleration measurement of the device along a third axis transverse to the first axis and the second axis; detecting an orientation change of the device based on the second acceleration measurement; detecting an initial lift-up gesture of the device based on the first, second, and third acceleration measurements; detecting a non-shaking state of the device based on the first, second, and third acceleration measurements; and outputting a lift-up gesture state in response to the orientation change, the initial lift-up gesture, and the non-shaking state being detected.

The method may further include: filtering the second acceleration measurement with a band pass filter, the detecting of the orientation change including detecting the orientation change in a case where the filtered second acceleration measurement is greater than a threshold value for a threshold amount of time.

The method may further include: filtering the first, second, and third acceleration measurements with a low pass filter, the detecting of the initial lift-up gesture including detecting the initial lift-up gesture in a case where an absolute value of the filtered first acceleration measurement is less than or equal to a first threshold value, the filtered second acceleration measurement is greater than a second threshold value, and the filtered third acceleration measurement is greater than a third threshold value for a threshold amount of time.

The method may further include: filtering the first, second, and third acceleration measurements with a low pass filter; setting a counter to a time out value in a case where a norm of the filtered first, second, and third acceleration measurements is greater than a threshold value; and decrementing the counter by one at a determined interval in a case where the norm of the filtered first, second, and third acceleration measurements is not greater than the threshold value, the detecting of the non-shaking state including detecting the non-shaking state in a case where the counter is equal to zero.

The outputting of the lift-up gesture state may include outputting the lift-up gesture state in a case where the initial lift-up gesture is detected after the non-shaking state is detected.

A device may be summarized as including: an accelerometer configured to generate first, second, and third acceleration measurements along first, second, and third axes, respectively; and a processor configured to: detect an orientation change of the device based on one of the first, second, and third acceleration measurements; determine whether the device is in a shaking state or a non-shaking state based on the first, second, and third acceleration measurements; detect a lift-up gesture of the device based on the first, second, and third acceleration measurements; validate the detected lift-up gesture in case the device is in the non-shaking state; and invalidate the detected lift-up gesture in case the device is in the shaking state.

The processor may be configured to: filter the first, second, and third acceleration measurements with a band pass filter; detect the orientation change of the device based on one of the first, second, and third acceleration measurements filtered by the band pass filter; filter the first, second, and third acceleration measurements with a low pass filter; determine whether the device is in the shaking state or the non-shaking state based on the first, second, and third acceleration measurements filtered by the low pass filter; and detect the lift-up gesture of the device based on the first, second, and third acceleration measurements filtered by the low pass filter.

The processor may be configured to: set a counter to a time out value in a case where a norm of the first, second, and third acceleration measurements is greater than a threshold value; decrement the counter by one at a determined interval in a case where the norm of the filtered first, second, and third acceleration measurements is not greater than the threshold value; determine the device is in the shaking state in a case where the counter is not equal to zero; and determine the device is in the non-shaking state in a case where the counter is equal to zero.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an accelerometer, which, in operation, generates a first acceleration measurement along a first axis, a second acceleration measurement along a second axis transverse to the first axis, and a third acceleration measurement along a third axis transverse to the first axis and the second axis;
processing circuitry, which, in operation, receives the first, second, and third acceleration measurements; and
memory coupled to the processing circuitry, wherein, using the memory, the processing circuitry, in operation:
filters the second acceleration measurement with a band pass filter;
detects an orientation change of the device in a case where the second acceleration measurement is greater than a first threshold value for a first threshold amount of time;
filters the first, second, and third acceleration measurements with a low pass filter;
detects an initial lift-up gesture of the device in a case where an absolute value of the filtered first acceleration measurement is less than or equal to a second threshold value, the filtered second acceleration measurement is greater than a third threshold value, and the filtered third acceleration measurement is greater than a fourth threshold value for a second threshold amount of time;
sets a counter to a time out value in a case where a norm of the filtered first, second, and third acceleration measurements is greater than a fifth threshold value, wherein the time out value is greater than a sum of the first threshold amount of time and the second threshold amount of time;
decrements the counter by one at a determined interval in a case where the norm of the filtered first, second, and third acceleration measurements is not greater than the fifth threshold value;
detects a non-shaking state of the device in a case where the counter is equal to zero; and
outputs a lift-up gesture state in response to the orientation change, the initial lift-up gesture, and the non-shaking state being detected,
wherein the lift-up gesture state is not output if the non-shaking state of the device is not detected.

2. The device of claim 1 wherein the first and second axes are in a plane including a surface of the device.

3. The device of claim 1 wherein the first and second axes are horizontal and vertical axes, respectively, in a plane including a surface of the device.

4. The device of claim 1 wherein the first threshold value is between 0.05 and 0.5 g, and the first threshold amount of time is between 150 and 500 milliseconds.

5. The device of claim 1 wherein the second threshold value is between 0.17 and 0.71 g, the third threshold value is between 0.09 and 0.71 g, and the fourth threshold value is between 0 and −0.71 g, and the second threshold amount of time is between 75 and 300 milliseconds.

6. The device of claim 1 wherein the fifth threshold value is between 1.1 and 1.5 g.

7. The device of claim 1 wherein the processing circuitry, in operation, outputs the lift-up gesture state in a case where the initial lift-up gesture is detected after the non-shaking state is detected.

8. A method, comprising:
receiving a first acceleration measurement of a device along a first axis, a second acceleration measurement of the device along a second axis transverse to the first axis, and a third acceleration measurement of the device along a third axis transverse to the first axis and the second axis;
filtering the second acceleration measurement with a band pass filter;
detecting an orientation change of the device in a case where the filtered second acceleration measurement is greater than a first threshold value for a first threshold amount of time;
filtering the first, second, and third acceleration measurements with a low pass filter;
detecting an initial lift-up gesture in a case where an absolute value of the filtered first acceleration measurement is less than or equal to a second threshold value, the filtered second acceleration measurement is greater than a third threshold value, and the filtered third acceleration measurement is greater than a fourth threshold value for a second threshold amount of time;

setting a counter to a time out value in a case where a norm of the filtered first, second, and third acceleration measurements is greater than a fifth threshold value;

decrementing the counter by one at a determined interval in a case where the norm of the filtered first, second, and third acceleration measurements is not greater than the fifth threshold value;

detecting a non-shaking state of the device in a case where the counter is equal to zero; and outputting a lift-up gesture state in response to the orientation change, the initial lift-up gesture, and the non-shaking state being detected, wherein the lift-up gesture state is not output if the non-shaking state of the device is not detected, and wherein the time out value is greater than a sum of the first threshold amount of time and the second threshold amount of time.

9. The method of claim 8 wherein the outputting of the lift-up gesture state includes outputting the lift-up gesture state in a case where the initial lift-up gesture is detected after the non-shaking state is detected.

10. A device, comprising:
an accelerometer configured to generate first, second, and third acceleration measurements along first, second, and third axes, respectively; and
a processor configured to:
filter the second acceleration measurement with a band pass filter;
detect an orientation change of the device in a case where the filtered second acceleration measurement is greater than a threshold value for a threshold amount of time, wherein the threshold value is between 0.05 and 0.5 g, and the threshold amount of time is between 150 and 500 milliseconds;
determine whether the device is in a shaking state or a non-shaking state based on the first, second, and third acceleration measurements;
detect a lift-up gesture of the device based on the first, second, and third acceleration measurements;
validate the detected lift-up gesture in case the device is in the non-shaking state;
invalidate the detected lift-up gesture in case the device is in the shaking state; and
output the detected lift-up gesture in case the device is in the non-shaking state, wherein the detected lift-up gesture is not output in case the device is in the shaking state.

11. The device of claim 10 wherein the processor is configured to:
filter the first, second, and third acceleration measurements with a low pass filter;
determine whether the device is in the shaking state or the non-shaking state based on the first, second, and third acceleration measurements filtered by the low pass filter; and
detect the lift-up gesture of the device based on the first, second, and third acceleration measurements filtered by the low pass filter.

12. The device of claim 10 wherein the processor is configured to:
set a counter to a time out value in a case where a norm of the first, second, and third acceleration measurements is greater than a threshold value;
decrement the counter by one at a determined interval in a case where the norm of the filtered first, second, and third acceleration measurements is not greater than the threshold value;
determine the device is in the shaking state in a case where the counter is not equal to zero; and
determine the device is in the non-shaking state in a case where the counter is equal to zero.

* * * * *